US008775331B1

(12) United States Patent
Tsuie et al.

(10) Patent No.: US 8,775,331 B1
(45) Date of Patent: Jul. 8, 2014

(54) POSTAGE METERING WITH ACCUMULATED POSTAGE

(75) Inventors: Mark Tsuie, Canoga Park, CA (US); Keith D. Bussell, Los Angeles, CA (US); J P Leon, Tucson, AZ (US)

(73) Assignee: Stamps.com Inc, El Segundo, CA (US)

( * ) Notice: Subject to any disclaimer, the term of this patent is extended or adjusted under 35 U.S.C. 154(b) by 680 days.

(21) Appl. No.: 11/616,569

(22) Filed: Dec. 27, 2006

(51) Int. Cl.
*G06F 17/00* (2006.01)
*G07B 17/02* (2006.01)
*G06Q 10/00* (2012.01)

(52) U.S. Cl.
USPC .......... 705/403; 705/1.1

(58) Field of Classification Search
USPC .......... 705/1.1, 7.11–7.35, 400–412
See application file for complete search history.

(56) References Cited

U.S. PATENT DOCUMENTS 5,077,792 A * 12/1991 Herring .......... 705/61
5,729,460 A * 3/1998 Plett et al. .......... 705/403
5,819,240 A * 10/1998 Kara .......... 705/408
5,960,418 A * 9/1999 Kelly et al. .......... 705/408
6,010,069 A * 1/2000 Debois .......... 235/380
6,199,055 B1 3/2001 Kara
6,430,543 B1 8/2002 Lee et al.
7,337,152 B1 * 2/2008 Gawler .......... 705/401
7,548,612 B2 6/2009 Weissman et al.
2003/0187666 A1 10/2003 Leon
2003/0236709 A1 12/2003 Hendra et al.
2004/0128264 A1 7/2004 Leung et al.
2004/0185882 A1 9/2004 Gecht et al.
2004/0215583 A1 * 10/2004 Elliott .......... 705/408
2005/0080751 A1 4/2005 Burningham
2007/0078795 A1 4/2007 Chatte
2011/0022544 A1 1/2011 Kim et al.
2011/0145107 A1 6/2011 Greco

FOREIGN PATENT DOCUMENTS

WO WO-9740472 10/1997
WO WO-03/083784 10/2003

OTHER PUBLICATIONS

U.S. Appl. No. 09/491,949, Salim G. Kara.
U.S. Appl. No. 10/606,579, Craig Ogg.
U.S. Appl. No. 10/696,221, Craig Ogg.
U.S. Appl. No. 10/862,058, Pagel et al.
U.S. Appl. No. 11/323,463, Leon et al.
U.S. Appl. No. 11/353,690, Salim G. Kara.

* cited by examiner

*Primary Examiner* — George Chen
(74) *Attorney, Agent, or Firm* — Fulbright & Jaworski LLP

(57) ABSTRACT

Systems and methods which provide metering of postage value using accumulated postage information are shown. Embodiments implement an accumulated postage register in a postage security device which is incremented each time a postage indicium is generated and which is reset when a postage value settlement operation is performed. Accumulated postage may be paid for using various accounts, including pre-funded or pre-paid accounts, credit accounts, debit accounts, and billing accounts. Accordingly, embodiments may be used with respect to a post-paid metering model, a pre-paid metering model, and combinations thereof.

36 Claims, 5 Drawing Sheets

POSTAGE METERING WITH ACCUMULATED POSTAGE

CROSS-REFERENCE TO RELATED APPLICATIONS

The present application is related to co U.S. patent application Ser. No. 11/353,690 entitled "System and Method for Validating Postage," filed Feb. 14, 2006, Ser. No. 09/491,949 entitled "System and Method for Printing Multiple Postage Indicia," filed Jan. 26, 2000, now U.S. Pat. No. 7,343,357, issued Mar. 11, 2008, Ser. No. 10/862,058 entitled "Virtual Security Device," filed Jun. 4, 2004, Ser. No. 10/994,768, entitled "Computer-Based Value-Bearing Item Customization Security," filed Nov. 22, 2004, now U.S. Pat. No. 7,243, 842, issued Jul. 17, 2007, Ser. No. 10/606,579, entitled "System and Method for Automatically Processing Mail," filed Jun. 26, 2003, Ser. No. 10/696,221, entitled "System and Method for Printing an Application of Dynamically Valued Stamps," filed Oct. 29, 2003, and Ser. No. 11/323,463 entitled "Systems and Methods for Single Pass Printing Postage Indicia," filed Dec. 20, 2005, the disclosures of which are hereby incorporated herein by reference.

TECHNICAL FIELD

The invention relates generally to metering of postage value and, more particularly, to providing an accumulated postage feature with respect to metering of postage value.

BACKGROUND OF THE INVENTION

Devices or "meters" used in the metering of postage value, such as for printing postage indicia used in posting mail pieces, typically include a vault mechanism having at least a descending register and an ascending register. Such a vault mechanism originated as an electromechanical device and has more recently been implemented as a secure electronic memory, often referred to as a postage security device (PSD).

The descending register provides a balance of prepaid postage value and is generally affected by two meter operations. A postage value download (PVD) meter operation increments the descending register in the amount of a postage value prepayment. For example, if a user purchases $10 of postage, the postage value stored in the descending register is incremented by $10 to increase the postage value available using the meter. Postal authorities, such as the United States Postal Service (USPS), often establish limits on the amount of postage value that may be downloaded in a postage value download operation and/or the maximum amount of postage value that may be held by a descending register in order to prevent fraud or misuse. A postage value decrementing operation is performed with respect to the descending register each time the meter is used to generate a postage indicium. For example, if a user operates the meter to generate a $0.39 postage indicium to apply to a first class mail piece, the aforementioned $10 of postage value stored by the descending register will be decremented by $0.39 to leave a postage value balance of $9.61. The descending register is never permitted to have a balance of less than $0, and is often not permitted to descend below some non-zero threshold amount (e.g., $1).

The ascending register provides a total of all postage value dispensed or metered by the meter. That is, the ascending register is incremented each time the meter is used to generate a postage indicium. For example, if a user operates a meter previously used in generating a total of $5.00 in postage indicia to generate a $0.39 postage indicium, the ascending register will be incremented by $0.39 to result in an ascending register total of $5.39. The ascending register is typically used in meter reconciliation operations, such as at the time of postage value download, in order to detect fraud or operational anomalies. A meter's service life is often dictated by a maximum allowable ascending register amount (e.g., $10, 000) in order to limit the propensity for fraud.

Although the foregoing meter configuration provides an adequate postage metering solution for many metering applications, it is not without disadvantage. For example, from the above, it is clear that payment must be made (e.g., money deposited) prior to generating postage indicium. This prepayment model has historically been required by postal authorities in order to avoid losses associated with nonpayment for postage indicia. Moreover, the prepayment model has typically been acceptable to meter users as such meters have traditionally been used by a single entity (e.g., business entity or person) which has the ability to forecast postage needs and thus can relatively accurately plan and prepay for postage needs. Despite accurate forecasting and proper planning, however, problems can arise in acquiring postage value for metering operations. For example, electronic meters are often funded using credit cards or other electronic forms of payment which may experience problems (e.g., due to credit card clearing house problems) causing delays in obtaining postage value download and thus delaying the ability to generate desired postage indicia. Moreover, mailing tasks requiring large amounts of postage (e.g., monthly billings, mass promotional mailings, etcetera) may necessitate close monitoring of available postage value and repeated postage value download in order to generate a total amount of postage indicia desired in light of postage value download and/or descending register maximum limits.

Moreover, in arriving at the present invention, the inventors hereof have discovered that the use of the prepayment model with its descending register as set forth above is disadvantageous with respect to a relatively new type of postage meter user. Specifically, users that provide postage metering services to their clients or customers (the users providing the services referred to herein as providers and their clients or customers referred to herein as end users) experience difficulty in the prepayment model. For example, such providers may be providing postage metering services to a large number of end users, and thus be unable to forecast and plan for the needed postage value. Moreover, limits set by the postal authority with respect to postage value download and/or descending register maximum amounts may be insufficient to serve end user demands for a desired period, thereby necessitating close monitoring of available postage value and repeated postage value download. Delays in processing postage value download, such as due to credit card clearing house problems or delays, may result in a large number of end users being dissatisfied with the providers' service.

BRIEF SUMMARY OF THE INVENTION

The present invention is directed to systems and methods which provide metering of postage value using accumulated postage information. Embodiments of the present invention implement an accumulated postage register in a postage security device (PSD) which is incremented each time a postage indicium is generated and which is reset (e.g., zeroed or decremented by an amount of payment) when a postage value settlement (PVS) operation is performed. The accumulated postage register of embodiments maintains a balance of postage value used that is paid or settled after generation of postage indicia having value associated with the accumulated postage register balance. Postage value settlement operations according to embodiments of the invention facilitates periodic payment for an exact amount of postage value used.

Accumulated postage may be paid for using various accounts according to embodiments of the invention. For example, rather than having a single descending register from which to draw postage value, a number of accounts may be used for payment of accumulated postage during a postage value settlement operation. Such accounts may include pre-funded or pre-paid accounts, credit accounts, debit accounts, billing accounts, etcetera. Accordingly, embodiments of the present invention may be used with respect to a post-paid metering model (e.g., payment for postage value is not made by a user until after postage indicia has been generated), a pre-paid metering model (e.g., payment for postage value may be made into an account separate from a postage security device prior to generation of postage indicia), and combinations thereof (e.g., payment for some postage value may be made into an account separate from a postage security device prior to generation of postage indicia while payment for additional postage value is not made until after postage indicia has been generated).

Embodiments of the present invention are particularly well suited for use by users (providers) that provide postage metering services to their clients or customers (end users). According to one embodiment, such providers (e.g., an online retailer such as Amazon.com, Inc. or online auctioneer such as eBay Inc. facilitating sales of items by end users to other end users whereby postage metering services are provided for use in shipping such items) may provide postage metering services for a large number of end users having significant total postage value. Using one or more accounts (whether pre-paid or post-paid) separate from the postage security device or devices used in generating postage indicia for the foregoing end users frees the provider from having to closely monitor postage value and perform postage value download operations timed to avoid delays in postage indicia generation. Moreover, the provider's forecasting of postage value associated with such postage indicia generation becomes less critical because, although the provider may desire to predict postage value use, operations and end user satisfaction will not be degraded where forecasts are lower than the actual amounts of postage value used.

Embodiments of the present invention are further suited for use by users which generate large volumes of postage indicia in high speed processes. For example, by incrementing an accumulated postage register, rather than the more traditional decrementing a descending register wherein a check of the descending register amount is performed prior to the decrementing step in order to assure sufficient postage value is available for the operation, postage metering operations may be streamlined to facilitate higher speed postage indicia generation.

Preferred embodiments of the invention are implemented in such a way as to minimize impact upon a postal authority, such as the USPS, participating in the use of accumulated postage metering. For example, a schedule of postage value settlement operations may be established whereby the postal authority perceives no delay with respect to payment for accumulated postage as compared to a more traditional pre-paid model. According to embodiments of the invention, a postage value settlement operation is performed at least daily (assuming postage indicia generation operations have also been performed daily) in order to provide for payment of accumulated postage within a period in which more traditional pre-payment settlements received through credit card clearinghouses would be received by the postal authority.

The foregoing has outlined rather broadly the features and technical advantages of the present invention in order that the detailed description of the invention that follows may be better understood. Additional features and advantages of the invention will be described hereinafter which form the subject of the claims of the invention. It should be appreciated by those skilled in the art that the conception and specific embodiment disclosed may be readily utilized as a basis for modifying or designing other structures for carrying out the same purposes of the present invention. It should also be realized by those skilled in the art that such equivalent constructions do not depart from the spirit and scope of the invention as set forth in the appended claims. The novel features which are believed to be characteristic of the invention, both as to its organization and method of operation, together with further objects and advantages will be better understood from the following description when considered in connection with the accompanying figures. It is to be expressly understood, however, that each of the figures is provided for the purpose of illustration and description only and is not intended as a definition of the limits of the present invention.

BRIEF DESCRIPTION OF THE DRAWING

For a more complete understanding of the present invention, reference is now made to the following descriptions taken in conjunction with the accompanying drawing, in which.

DETAILED DESCRIPTION OF THE INVENTION

Figure 1:
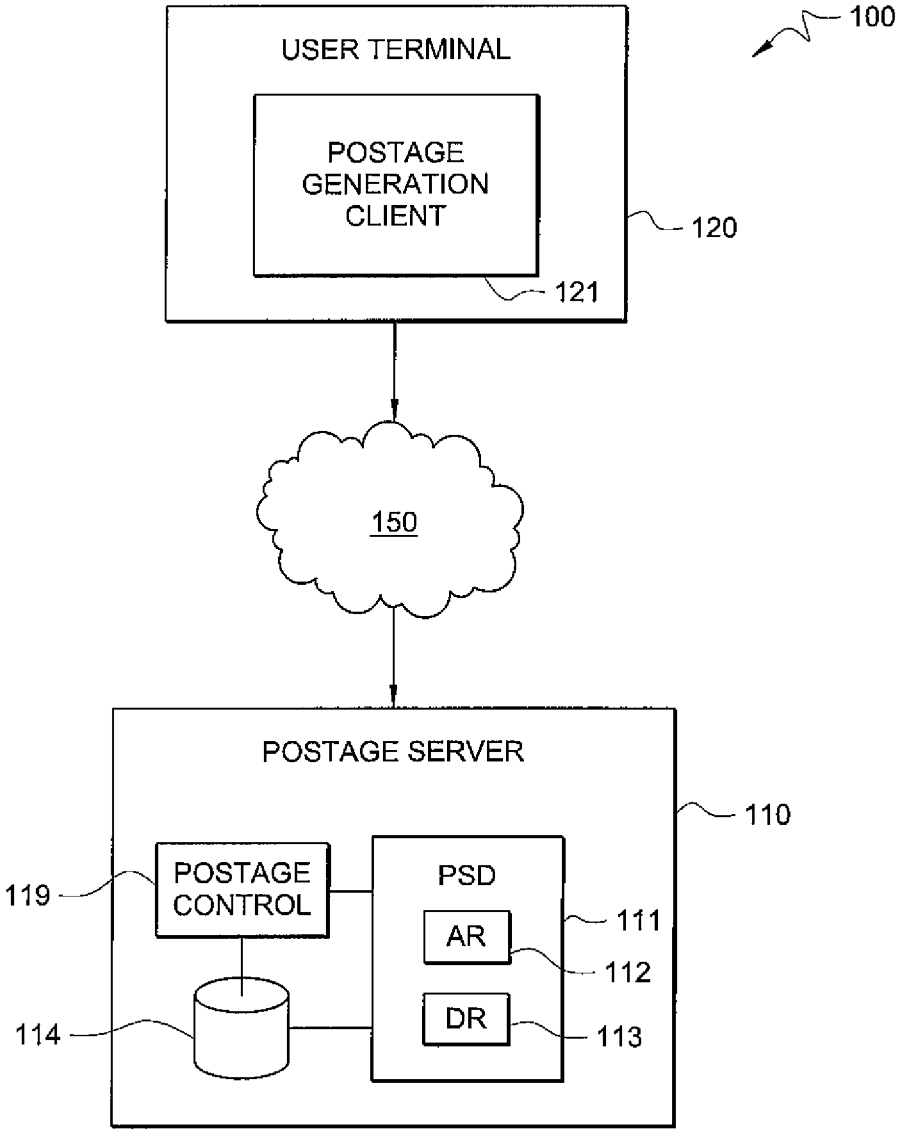
FIG. 1 (Prior Art)
FIG. 1 shows a prior art metering system configuration.

To aid in understanding the concepts of the present invention, a prior art system configured for providing postage indicia generation over a network will be briefly described. FIG. 1 shows metering system 100 in which postage server 110 and user terminal 120 interact via network 150 for performing various postage metering functions.

Postage server 110 may comprise a computer based server (e.g., web server) operable under control of postage control application 119 and having a secure memory (e.g., cryptographic memory module) configured to provide operation as postal security device (PSD) 111. PSD 111 includes ascending register 112 and descending register 113 utilized in providing postage metering operations. Database 114 includes various information used in providing postage metering services. For example, database 114 may include information for identifying and authenticating a user and/or postage generation client for postage metering operations. Moreover, database 114 may store postage information for configuring PSD 111 for use with respect to different users. For example, database 114 may store ascending register values, descending register values, etcetera for each of a plurality of users (e.g., in cryptographic form, perhaps also in clear text), facilitating operation of postage server 110 to configure PSD 111 to temporarily provide a postage meter unique to a particular user. Thus a plurality of different user terminals may interact with postage server 110 to generate postage indicia from different meter accounts. Postage server 110 may additionally include a transaction log (not shown) for storing information with respect to individual transactions conducted using postage server 110, perhaps including details such as user identification, postage meter identification, account information, transaction type, transaction amount, time and/or date information, etcetera.

User terminal 120 may comprise a computer based user terminal operable under control of postage generation client application 121 for interacting with postage server 110 in providing postage metering operations. For example, a user may interact with user terminal 120 to cause a credit card account to be debited, transfer the debited value to postage server 110, and perform a postage value download operation resulting in descending register 113 being incremented. Similarly, a user may interact with user terminal 120 to select a desired amount of postage, request generation of a postage indicium by postage server 110 resulting in descending register 113 being decremented and ascending register 112 being incremented, and printing the generated postage indicium at a printer (not shown) local to user terminal 120.

Network 150 may comprise a network suitable for providing data communication between postage server 110 and postage generation client 120. For example, network 150 may comprise the Internet.

Metering system 100 provides an excellent solution for many typical postage metering applications. For example, traditional postage metering operations for an entity, such as a business or individual, wherein postage needs may be readily forecast and wherein drawing postage value from a single account associated with the entity is desirable may be adequately served by metering system 100.

Figure 2:
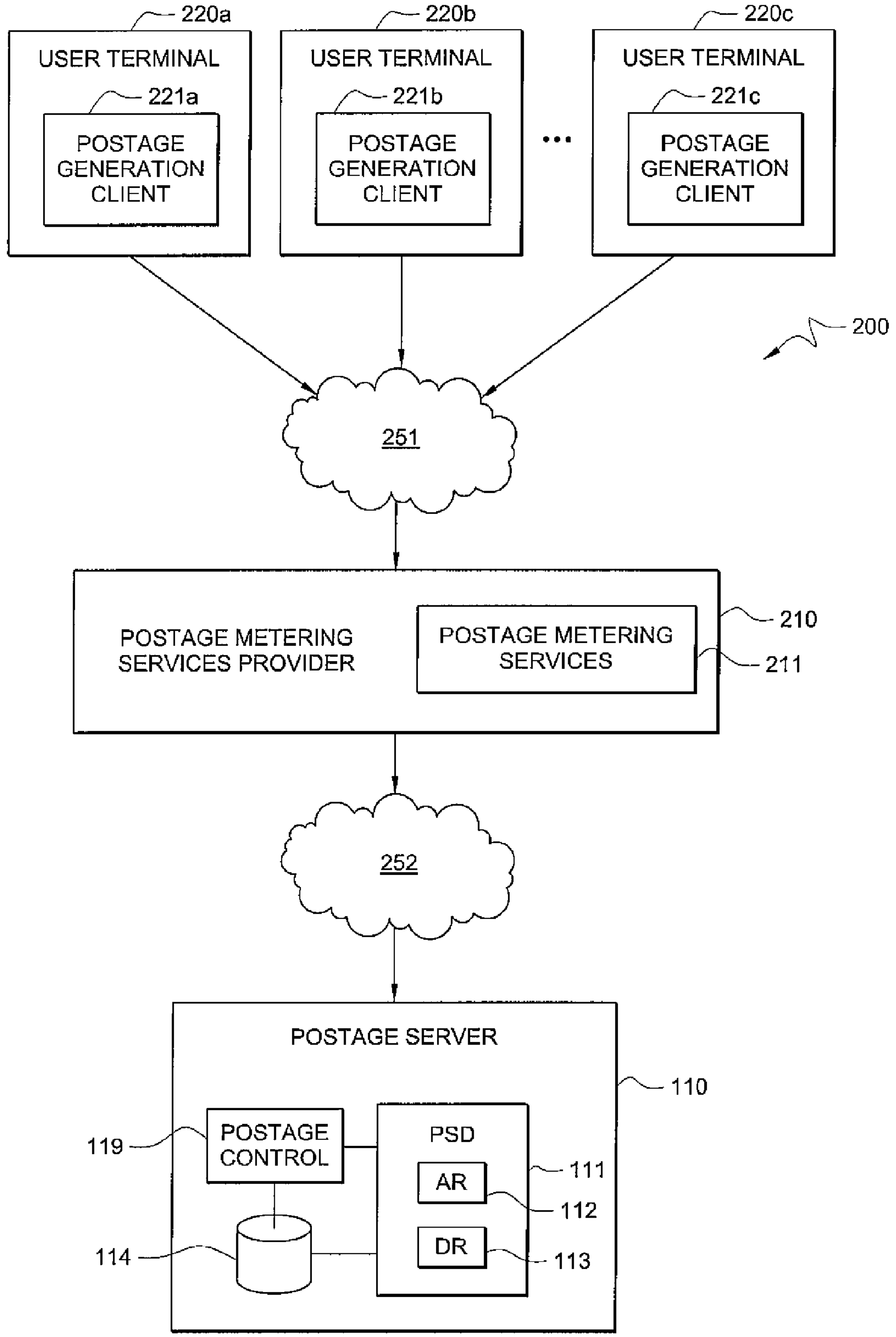
FIG. 2 shows a metering system configuration adapted for a postage metering services provider to provide postage metering services to a plurality of end users.

Directing attention to FIG. 2, metering system 200 adapted to provide postage metering with respect to a postage metering services provider providing postage metering services to end users is shown. In the embodiment of FIG. 2, postage metering services provider system 210 is disposed between a plurality of end users, using user terminals 220*a*-220*c*, and postage server 110. Postage metering services provider system 210 may comprise a computer based system operable to provide various services to end users. For example, postage metering services provider system 210 may provide online retail services (e.g., Amazon.com, Inc.) or online auction services (e.g., eBay Inc.) facilitating sales of items by and between end users. To facilitate such sales of items, postage metering services provider system 210 may further provide postage metering services, whereby end users may purchase and print postage indicia, for use in shipping the items. However, rather than having a meter or PSD uniquely associated with the end user, the end user will be provided postage indicia from a meter or PSD associated with the postage metering services provider.

User terminals 220*a*-220*c* are coupled to postage metering services provider system 210 via network 251 and postage metering services provider system 210 is coupled to postage server 110 via network 252. Networks 251 and 252 may comprise a local area network (LAN), metropolitan area network (MAN), wide area network (WAN), intranet, extranet, the Internet, the public switched telephone network (PSTN), and/or other network suitable for data communication between user terminals 220*a*-220*c*, postage metering service provider system 210, and postage server 110. Postage generation client applications 221*a*-221*c* may interact with postage metering services application 211 to request a desired amount of postage and provide payment therefore (e.g., using electronic funds transfer, such as to debit a credit card account). Thereafter, postage metering services application 211 may request generation of a postage indicium by postage server 110 resulting id descending register 113 being decremented and ascending register 112 being incremented. The generated postage indicium may be provided to a requesting one of postage generation client applications 221*a*-221*c* for printing at a printer (not shown) local to a respective one of user terminals 220*a*-220*c*.

Postage metering services provider system 210 may additionally interact with postage server 210 to perform a postage value download operation with respect to PSD 111. For example, postage metering services application 211 may periodically (e.g., upon detecting a value available in descending register 113 falling below a predetermined threshold, upon user terminals 220*a*-220*c* obtaining a predetermined amount of postage value, etcetera) cause an account (e.g., a credit card account, a debit account, etcetera) to be debited, transfer the debited value to postage server 110, and perform a postage value download operation resulting in descending register 113 being incremented. Such postage value may thus be available for generation of postage indicia for any of user terminals 220*a*-220*c*.

Although metering system 200 of FIG. 2 may operate to allow a provider to provide postage metering services to a plurality of end users, the illustrated configuration is not without disadvantages. For example, the postage metering services provider is unlikely to be able to forecast and plan for the postage value needed to provide postage services to the plurality of end users and the configuration of FIG. 2 utilizes pre-paid postage value in the generation of postage indicia. Moreover, limits set by the postal authority with respect to postage value download and/or descending register maximum amounts may be insufficient to serve end user demands for a desired period, thereby necessitating close monitoring of available postage value and repeated postage value download. Delays in processing postage value download, such as due to credit card clearing house problems or delays, may result in a large number of end users being dissatisfied with the providers' service.

Figure 3:
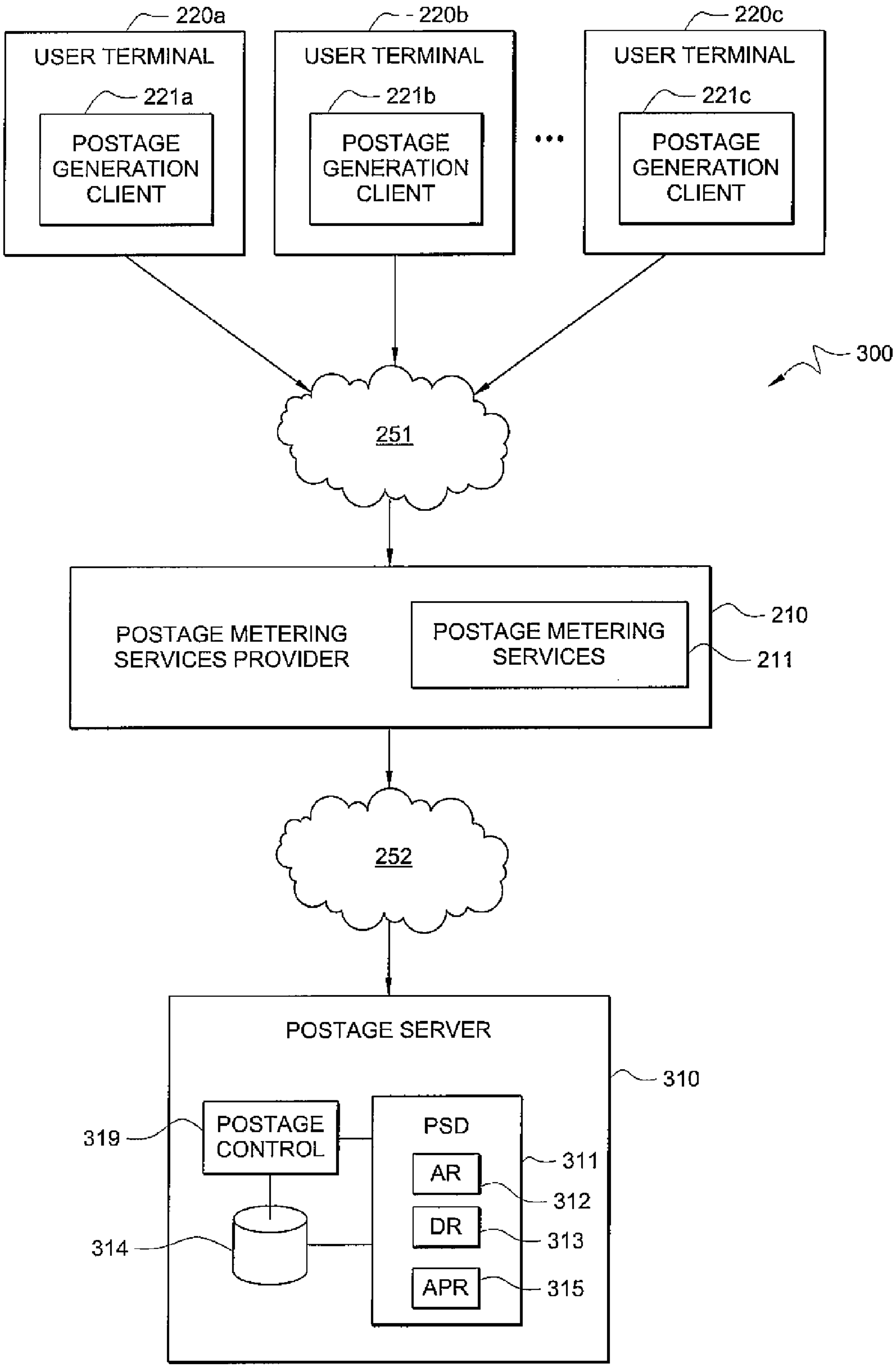
FIG. 3 shows a metering system configured according to an embodiment of the invention to include an accumulated postage feature.

Directing attention to FIG. 3, a preferred embodiment configuration is illustrated in which metering system 300 is adapted to provide postage metering using accumulated postage information. In the embodiment of FIG. 3, postage server 310 comprise a computer based server (e.g., web server) operable under control of postage control application 319 and having a secure memory (e.g., cryptographic memory module) configured to provide operation as postal security device (PSD) 311. PSD 311 of the illustrated embodiment includes ascending register 312, descending register 313, and accumulated postage register 315 utilized in providing postage metering operations. Database 314 includes various information used in providing postage metering services. For example, database 314 may include information for identifying and authenticating a user and/or postage generation application for postage metering operations. Moreover, database 314 may store postage information for configuring PSD 311 for use with respect to different users. For example, database 314 may store ascending register values, descending register values, accumulated postage registers, etcetera for each of a plurality of users (e.g., in cryptographic form, perhaps also in clear text), facilitating operation of postage server 310 to configure PSD 311 to temporarily provide a postage meter unique to a particular user or entity. Postage server 310 may additionally include a transaction log (not shown) for storing information with respect to individual transactions conducted using postage server 110, perhaps including details such as user identification, postage meter identification, account information, transaction type, transaction amount, time and/or date information, etcetera. Details with respect to computer based postage metering systems which may be adapted according to embodiments of the present invention are shown and described in the above referenced patent applications entitled "System and Method for Validating Postage," "System and Method for Printing Multiple Postage Indicia," and "Virtual Security Device."

It can be appreciated from the above that PSD 311 of metering system 300 includes adaptation to provide accumulated postage register 315. Accumulated postage register 315 of embodiments of the invention is incremented each time a postage indicium is generated and is set to zero or decremented by an amount of payment when a postage value settlement (PVS) operation is performed. Accordingly, accumulated postage register 315 of embodiments maintains a balance of postage value used that is paid or settled after generation of postage indicia having value associated with the accumulated postage register balance. Postage value settlement operations according to embodiments of the invention facilitates periodic payment for an exact amount of postage value used.

Embodiments of the invention may include adaptation to provide confidence with respect to the accuracy of financial and/or other information. As discussed above, information for configuring PSD 311 for operation as a particular user's postage meter may be stored in database 314. Although such information may include cryptographic or other security measures to protect or obscure some or all of the data stored in database 314, embodiments of the invention may implement features to detect an out-of-date database entry (e.g., resulting from a system crash and subsequent restoring of backup records, a "replay" attack wherein an out-of-date, although previously valid, database record is inserted into the database, etcetera) or to otherwise determine if database 314 is out of sync with PSD 311. Embodiments of the invention may additionally or alternatively implement features to detect that a transaction log is out-of-sync with PSD 311. For example, embodiments of the invention store information with respect to all financial transactions (e.g., postage value credit transactions, postage value debit transactions, postage value reconciliation transactions, etcetera) in PSD 311, database 314, and a transaction log, whereby some or all of this information may be utilized to detect an out-of-sync status between any of the foregoing.

According one embodiment of the invention, PSD 311 stores a running total of all postage printed using PSD 311, a running total of all postage reset through PSD 311, and all postage returned through PSD 311. The foregoing information is preferably stored in registers of PSD 311 which remain unaffected by the loading and unloading of postage meter information from database 314 in configuring PSD 311 to operate as a postage meter for a particular user. Accordingly, the foregoing running totals remain stored within PSD 311 irrespective of the status of various meter configuration information. The running totals stored by PSD 311 may be compared to various totals derived from the information stored in database 314 (e.g., totals derived from separate postage meter records for meter configurations which use PSD 311 in operation) to determine an out-of-sync state between PSD 311 and database 314. Similarly, the running totals stored by PSD 311 may be compared to various totals derived from the information stored in a transaction log (not shown) to determine an out-of-sync state between PSD 311 and the transaction log.

In providing detection of out-of-sync or out-of-date information with respect to accumulated postage, embodiments of the present invention additionally or alternatively store a running total of postage printed using accumulating balance registers and a running total of postage reconciled with respect to accumulating balance registers. That is, each time any meter configuration using PSD 311 generates a postage indicium for which the value is accounted for using an accumulating balance register, the foregoing running total of postage printed using accumulating balance registers will be incremented by an appropriate amount. Similarly, each time accumulated postage value which was accumulated using PSD 311 is reconciled or paid (e.g., a postage value settlement operation is performed), the foregoing running total of postage reconciled will be incremented by an appropriate amount. As with the running totals discussed above, the running totals stored in PSD 311 with respect to accumulated postage is preferably stored in registers of PSD 311 which remain unaffected by the loading and unloading of postage meter information from database 314 in configuring PSD 311 to operate as a postage meter for a particular user.

The foregoing running totals may be utilized to ensure that the postal authority is properly recompensed even in the situation that database 314 and/or an associated transaction log are unavailable, such as due to a system failure or other disaster. For example, although perhaps not reflecting detail with respect to which individual users are responsible for payment, a comparison of the running total of postage printed using accumulating balance registers and the running total of postage reconciled with respect to accumulating balance registers may be utilized to determine an amount owed to the postal authority in association with the use of accumulated postage registers of embodiments of the invention.

Figure 4:
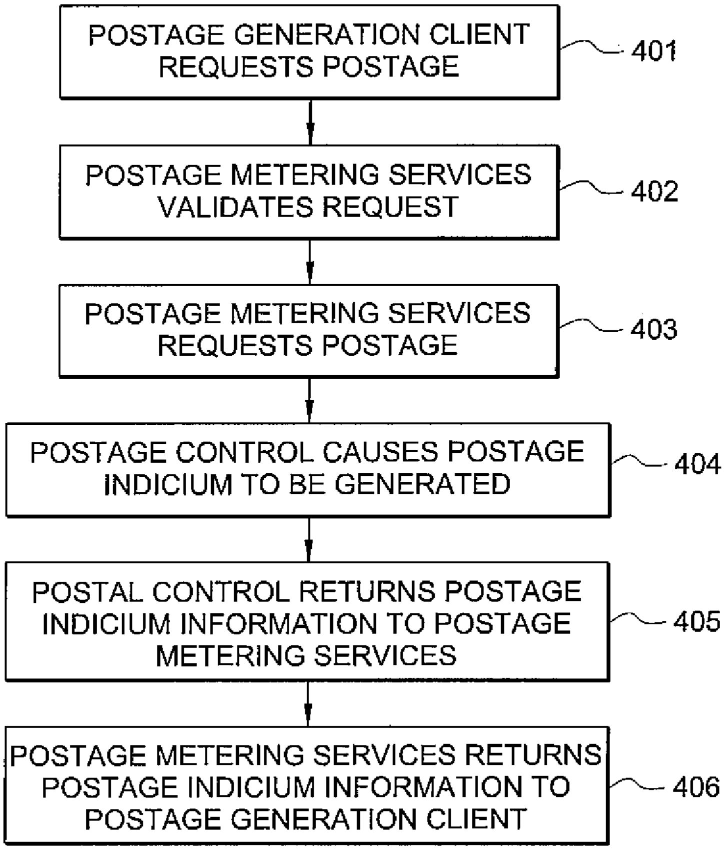
FIG. 4 shows a process for obtaining postage value from the metering system of FIG. 3.

Directing attention to FIG. 4, a process for generation of postage indicia according to one embodiment using metering system 300 of FIG. 3 is shown. At block 401 of the illustrated embodiment, one of postage generation client applications 221*a*-221*c* transmits a request for a postage indicium via network 251 to postage metering services provider system 210. Postage metering services application 211 validates the postage indicium request at block 402. For example, one or more digital signatures or other information (e.g., personal identification number (PIN), biometric information, password, cryptographic string, machine authentication code (MAC), etcetera) may be used to verify that the end user, user terminal, and/or postage generation client application are authorized to obtain postage indicia. In addition to or in the alternative to validation information, a postage indicium request issued according to embodiments of the invention may include information with respect to payment for the requested postage indicium. For example, account information, such as credit card information, debit account information, pre-paid account information, etcetera, may be provided to facilitate payment from an end user of one of user terminals 220*a*-220*c* requesting the postage indicium to a provider associated with postage metering services provider system 210. It should be appreciated, however, that the provider may not require an end user to provide such payment information in or with a postage indicium request, such as where the provider implements a model in which the end user is periodically billed for postage metering services or where the provider holds a pre-paid account on behalf of the end user.

Assuming the request has been properly validated, postage metering services application 211 requests generation of a postage indicium by postage server 310 via network 252 at block 403 of the illustrated embodiment. If, however, the request fails validation (e.g., the end user, user terminal, and/or postage generation client application are not authorized to request postage indicia, payment has not properly been provided for the postage indicium, the requested postage value would cause the accumulated postage value to exceed a predetermined maximum value, etcetera), generation of the requested postage indicium is preferably prevented by postage metering services application 211 of embodiments.

At block 404, postage control application 319 causes the requested postage indicium to be generated. According to embodiments of the invention, postage control application 319 interacts with database 314 and PSD 311 to generate the postage indicium. For example, postage control application 319 may interact with database 314 to retrieve PSD configuration information associated with a postage metering services provider operating postage metering services provider system 210. The retrieved PSD configuration information may include information such as ascending register value and accumulated postage register value for uniquely configuring PSD 311 as the postage metering services provider's meter vault. This PSD configuration information may be provided to PSD 311 by postage control application 319. PSD 311 may thereafter decrypt or otherwise access the PSD configuration information and configure itself for metering operations with respect to the postage metering services provider. PSD 311, as configured using the PSD configuration information, then operates to generate the postage indicium data. PSD 311 and postage control application 319 preferably cooperate to create the requested postage indicium using the aforementioned postage indicium data. Various information, such as PSD identification information, ascending register value, accumulated postage register value, end user identification, postage generation client application identification information, sender address information, recipient address information, etcetera, and/or portions thereof, may be included in the generated postage indicium. Details with respect to operation of postage control applications and postage security devices in generating postage indicia are provided in the above referenced patent applications entitled "System and Method for Printing Multiple Postage Indicia" and "Virtual Security Device."

In generating the postage indicium according to a preferred embodiment of the present invention, PSD 311 increments both ascending register 312 and accumulated postage register 315 by the amount of postage value represented by the postage indicium. Embodiments of the present invention do not utilize descending register 313 where PSD 311 is configured to utilize accumulated postage register 315. Accordingly, descending register 313 may remain with a zero or other value throughout the postage indicium generation operation. In such embodiments where accumulated postage register 315 is used, descending register 313 may be omitted, if desired. In alternative embodiments, both descending register 313 and accumulated postage register 315 may be used in generation of postage indicia. For example, a pre-paid value represented by descending register 313 may be decremented until such value is depleted (or reaches a predetermined threshold) and thereafter accumulated postage register 315 incremented in association with the generation of one or more postage indicia.

Embodiments of the invention operate to store transaction information associated with the generation of the postage indicium in database 314 for later use in reconciliation of the PSD values. For example, a history of postage value deductions since a last reconciliation, such as may have occurred at a last postage value settlement operation, may be stored by postage control application 319 in database 314 and associated with the meter configuration used by PSD 311 for those particular transactions.

At block 405 of the illustrated embodiment, postage control application 319 returns postage indicium information to postage metering services application 211. Postage metering services application 211 likewise returns the postage indicium information to the requesting one of postage generation client applications 221*a*-221*c*. The postage indicium information preferably provides sufficient information for the receiving one of postage generation client applications 221*a*-221*e* to cause the desired postage indicium to be printed by an associated one of user terminals 220*a*-220*c*. For example, the postage indicium information may comprise a digitized graphical representation of the postage indicium. Alternatively, the postage indicium information may comprise information from which the postage generation client application can produce a postage indicium. In some embodiments of the invention, the postage indicium information comprises a locator (e.g., a uniform resources locator (URL)) for a location from which the generated postage indicium may be obtained.

Figure 5:
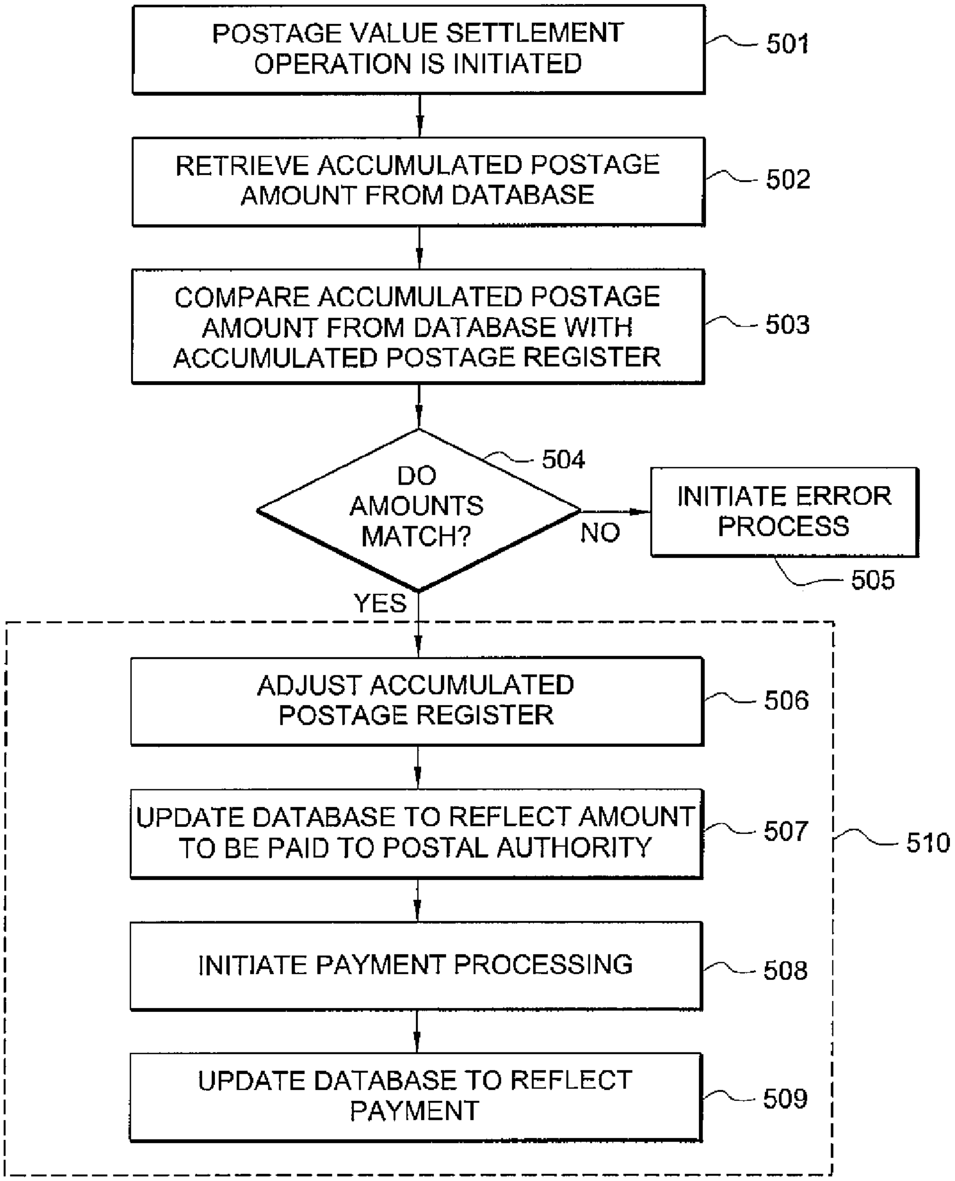
FIG. 5 shows a process for settlement of accumulated postage value using the metering system of FIG. 3.

Directing attention to FIG. 5, a process for a postage value settlement operation according to one embodiment using metering system 300 of FIG. 3 is shown. At block 501 of the illustrated embodiment, a postage value settlement operation is initiated. The postage value settlement operation may be initiated by the postage metering services provider, the postage server provider, the postal authority, or other interested party, and may be initiated periodically, automatically, upon the occurrence of an event, etcetera. For example, postage control application 319 may periodically (e.g., twice daily, daily, weekly, monthly, etcetera) initiate a postage value settlement operation. Such periodic postage value settlement operations may, for example, establish a schedule of postage value settlement operations whereby the postal authority perceives no delay with respect to payment for accumulated postage as compared to a more traditional pre-paid model. Accordingly, embodiments of the invention perform a postage value settlement operation at least daily (assuming postage indicia generation operations have also been performed daily) in order to provide for payment of accumulated postage within a period in which more traditional pre-payment settlements received through credit card clearinghouses would be received by the postal authority. Additionally or alternatively, embodiments of the invention perform a postage value settlement operation when the value of the accumulated postage register reaches or exceeds a predetermined maximum threshold value (e.g., the accumulated postage value reaches $1,000) to thereby limit the risk of non-payment for postage.

At block 502 of the illustrated embodiment, postage control application 319 obtains the accumulated postage value for one or more meter configurations associated with PSD 311 from database 314 (e.g., clear text information showing the value of accumulated postage corresponding to an amount securely stored in data for a particular meter configuration which, when loaded into PSD 311, has a corresponding value in accumulated postage register 315). At block 503, the accumulated postage amount retrieved from the database is compared to an amount stored in a corresponding accumulated postage register. For example, postage server 310 may obtain information from database 314 regarding ascending register values, descending register values, accumulated postage registers, etcetera for temporarily configuring PSD 311 as a postage meter unique to a particular user or entity for which a postage value settlement operation is being performed. The accumulated postage register value (the value of accumulated postage register 315 when PSD 311 is configured as the appropriate postage meter) may be compared to the accumulated postage value retrieved from database 314 at block 501.

If it is determined that the accumulated postage register value does not match the retrieved accumulated postage value at block 504, processing according to the illustrated embodiment proceeds to block 505 wherein an error process is initiated. For example, embodiments of the invention use the obtained accumulated postage value both to obtain payment for postage value used and to reconcile metering operations (e.g., to detect fraud and/or misuse). In reconciling the meter operations, postage control application 319 may obtain historical transaction information stored in database 314 and/or a value of ascending register 312. This information may be utilized to determine an amount of postage value provided by PSD when configured as a meter for those transactions and compare this amount to the accumulated postage register value. If there is a difference, perhaps allowing for minor variation, fraud or misuse may be indicated. If fraud or misuse is indicated, embodiments of the present invention operate to prevent further postage value debiting using the associated meter configuration. Accordingly, PSD 311 may be prevented from implementing a meter configuration using ascending register 312 and accumulated postage register 315 to generate postage indicia at block 505. This meter configuration may be allowed to resume postage value debit operation (e.g., generation of postage indicia) after further processing, such as a manual reconciliation process, which concludes fraud or misuse has not occurred.

If it is determined that the accumulated postage register value does match the retrieved accumulated postage value at block 504, processing according to the illustrated embodiment proceeds to block 506 wherein the value of accumulated postage register 315 (assuming PSD 311 is configured as the appropriate postage meter) is adjusted. For example, if the balance of accumulated postage is being paid in full, accumulated postage register 315 is preferably zeroed. Alternatively, if some amount less than the balance of accumulated postage is being paid, accumulated postage register 315 is decremented by an appropriate amount.

At block 507, a record associated with a meter configuration or configurations for which the postage settlement operation is being performed is updated to reflect the amount to be paid to one or more postal authority. Actual payment processing is initiated at block 508 of the illustrated embodiment. Such payment processing my invoke various payment systems, such as to perform electronic funds transfer, etcetera. It should be appreciated that accumulated postage may be paid for using various accounts according to embodiments of the invention. For example, a number of accounts may be used for payment of accumulated postage during the postage value settlement operation. Such accounts may include pre-funded or pre-paid accounts (e.g., pre-paid credit of the postage metering service provider stored in database 314 or elsewhere, for example by a third party service such as provided by PayPal, Inc.), credit accounts (e.g., credit card accounts, lines of credit, etcetera), debit accounts (e.g., debit card accounts, electronic funds transfer, check conversion, etcetera), billing accounts (e.g., post-paid account, etcetera), and/or the like. It should be appreciated that payment for some postage value may be made into an account separate from a postage security device prior to generation of postage indicia while payment for additional postage value is not made until after postage indicia has been generated through accessing these accounts during the postage value settlement operation. Accordingly, payment for some or all the postage value is not made by a user until after postage indicia has been generated according to embodiments of the invention. Additionally or alternatively, payment for some or all the postage value may be made prior to generation of postage indicia according to embodiments of the invention.

Although embodiments of the invention allow partial payment of the accumulated postage in a postage value settlement operation, other embodiments require full payment of the accumulated postage or operate to prevent further postage value debiting using the associated meter configuration. Embodiments of the present invention facilitate over-payment of the postage value to thereby obtain a pre-payment amount to be used with respect to generation of postage indicia in the future. An amount of over-payment may be stored in an account separate from any registers of the PSD or may be stored by a register of the PSD (e.g., descending register 313).

After payment processing has successfully resulted in payment being made to the postal authority or postal authorities, block 509 of the illustrated embodiment updates a record associated with the meter configuration or configurations for which the postage settlement operation is being performed to reflect payment having been made. Additionally, embodiments of the invention operate to update a transaction log with information regarding the settlement operation.

It should be appreciated that the illustrated embodiment implements several steps in completing a settlement operation. In order to assure the accuracy of financial information, it may be desirable to perform various ones of such settlement operation steps atomically. That is, in an atomic transaction, some number of steps may be required to all complete successfully or a previous state be reset. The various processes represented by blocks 506-509 are preferably performed as atomic transaction 510. Detail with respect to performing various atomic transactions are shown and described in U.S. Pat. No. 6,199,055 entitled "System and Method for Providing Fault Tolerant Transactions Over an Unsecured Communication Channel," the disclosure of which is hereby incorporated herein by reference.

In order to aid in understanding the operation of an accumulated postage register according to embodiments of the present invention, a state table showing the states of ascending register 312, descending register 313, and accumulated postage register 315 of an embodiment of metering system 300 in association with various operations is provided below. The state table further shows the states of ascending register 112 and descending register 113 of metering system 100 in association with the various operations for comparison.

| | Metering System 100 | | Metering System 300 | | |
|---|---|---|---|---|---|
| | Ascending Register 112 | Descending Register 113 | Ascending Register 312 | Descending Register 313 | Accumulated Postage Register 315 |
| Start | 0 | 0 | 0 | 0 | 0 |
| Buy $5 Postage | 0 | 5 | N/A | N/A | N/A |
| Print 0.39 cents | 0.39 | 4.61 | N/A | N/A | N/A |
| Print .39 cents using negative balance meter | N/A | N/A | .39 | 0 | .39 |
| Reconcile | N/A | N/A | .39 | 0 | 0 |

Although embodiments of the invention have been described herein as incrementing an accumulated postage register as postage value is dispensed by a postal security device, alternative embodiments operate differently. For example, an alternative embodiment of the present invention includes adaptation of a descending register, such as descending register 313, to allow for balances less than zero (i.e., negative balances). In such an embodiment, the descending register may be decremented by an appropriate amount of postage value. In contrast, during a postage value settlement operation, the descending register may be incremented by an amount of payment.

From the above, it should be appreciated that embodiments of the present invention may be operated to provide a post-paid metering model (e.g., payment for postage value is not made by a user until after postage indicia has been generated). Such a post-paid metering model generally presents some risk with respect to obtaining payment for the postage value. However, such a model is particularly useful with respect to postage metering service providers who provide postage metering services to a large number of users and/or a high volume of postage metering. Such providers tend to be large, institutional entities. Accordingly, the risk of obtaining payment for the postage value may be considered to be acceptable for such entities. Moreover, using controls for initiating postage value settlement operations, such as the aforementioned periodic and maximum amount triggers, risks with respect to obtaining payment for the postage value may be further mitigated. Additionally, implementing post-paid metering with respect to any particular entity may be provided only after an approval process, such as may include approval by the postal authority. As yet another mitigating factor with respect to risk of payment, it is envisioned that the operator of the postage server will also be approved by the postal authority, and thus present a reliable secondary source for payment should the postage metering services provider fail to properly pay for postage value.

Although the post-paid metering model may not be implemented with respect to all users for business or other reasons, embodiments of the present invention may still be utilized with respect to users other than those qualifying for operation according to a post-paid model. From the above, it should be appreciated that embodiments of the present invention may be operated to provided a pre-paid metering model (e.g., payment for postage value may be made into an account separate from a postage security device prior to generation of postage indicia). Accordingly, various users may deposit funds with a trusted source (e.g., the postage metering services provider, the postage server provider, the postal authority, etcetera) for debiting during a postage value settlement operation according to embodiments of the invention. Such pre-paid accounts may be verified with respect to a postage generation request, such as in the aforementioned validation operation, to ensure sufficient pre-paid funds are present to service the request.

Additionally or alternatively, a more restricted version of a post-paid metering model may be implemented with respect to users other than those qualifying for operation according to a more robust post-paid model. For example, a maximum accumulated postage amount for such users may be set very low to provide a kind of "overdraft" protection feature, thereby allowing such users to complete a postage indicium generation operation where their pre-paid funds are only slightly insufficient to fund the requested postage value.

It should be appreciated that, although embodiments of the present invention have been described with reference to adapting a PSD to include an accumulated postage register, embodiments of the invention my be adapted to provide for accumulated postage without an accumulated postage register having been provided in a PSD. For example, an embodiment of the invention operates to generate a postage indicium acceptable to a postal authority for delivery services without performing a metering operation, wherein a metering operation to fully validate the generated postage indicium, along with providing payment for the indicium, is performed subsequently.

According to one embodiment, the postage indicium generated without a metering operation includes a reduced set of information. For example, the postage indicium generated without a metering operation may include information for use in delivery of a postal item (e.g., delivery zip code, amount of postage, postal class, etcetera), but may omit validation information (e.g., a digital signature) provided through a metering operation. Such postage indicium preferably includes information for linking the postage indicium to validation information (e.g., a pointer to a datapacket, such as another indicium, generated from a metering operation). An example of a postage indicium generated without a metering operation which includes information for linking the postage indicium to validation information is a "light" information based indicia, examples of which are shown and described in the above referenced patent applications entitled "Computer-Based Value-Bearing Item Customization Security," "System and Method for Automatically Processing Mail," "System and Method for Printing an Application of Dynamically Valued Stamps," and "Systems and Methods for Single Pass Printing Postage Indicia."

In operation according to embodiments using the foregoing light indicia, database entries and/or transaction logs are updated to reflect the generation of such light indicia. Each such light indicia may include a unique number or other information for use in subsequently associating the indicium with a validating datapacket. Thereafter, perhaps in a batch operation, a metering operation may be performed to account for monies owed to a postal authority and to generate the appropriate datapackets for validating the light indicia. For example, postage server 310 may operate under control of postage control 319 to debit appropriate amounts from descending register 313. In response to such operation, PSD 311 may generate "full" information based indicia corresponding to the light indicia. The full indicia preferably includes security information, such as a digital signature, suitable for verifying the validity of the indicium. Such full indicia may be uniquely associated with a corresponding light indicium through the use of the above mentioned linking information. The full indicia may be provided to, or otherwise made available to, the postal authority for use in validating the light indicia. Such an embodiment may utilize more typical meter funding operations with respect to the full indicia, albeit allowing for purchasing postage value after the light postage indicia have been generated. Accordingly, such an embodiment provides for the use of accumulated postage without adapting the PSD, or other secure meter component, to include an accumulated postage register.

Although the present invention and its advantages have been described in detail, it should be understood that various changes, substitutions and alterations can be made herein without departing from the spirit and scope of the invention as defined by the appended claims. Moreover, the scope of the present application is not intended to be limited to the particular embodiments of the process, machine, manufacture, composition of matter, means, methods and steps described in the specification. As one of ordinary skill in the art will readily appreciate from the disclosure of the present invention, processes, machines, manufacture, compositions of matter, means, methods, or steps, presently existing or later to be developed that perform substantially the same function or achieve substantially the same result as the corresponding embodiments described herein may be utilized according to the present invention. Accordingly, the appended claims are intended to include within their scope such processes, machines, manufacture, compositions of matter, means, methods, or steps.

What is claimed is:

1. A system for metering postage value, said system comprising:

a postage security device securely storing a plurality of postage registers therein, said plurality of postage registers include an accumulated postage value register; and postage control code operable with said postage security device to dispense requested postage value, wherein said accumulated postage value register is incremented under control of said postage control code by a portion of said requested postage value not previously paid for when said requested postage value is dispensed, and wherein said accumulated postage value register is decremented under control of said postage control code by an amount of payment for postage value previously dispensed.

2. The system of claim 1, wherein said postage security device and said postage control code comprise a postage server system.

3. The system of claim 2, further comprising:

a postage metering services provider system disposed between an end user requesting said postage value and said postage server system.

4. The system of claim 3, wherein said postage metering services provider system provides end user services in addition to said postage metering services, wherein said postage metering services are ancillary to said other services.

5. The system of claim 4, wherein said other services comprise sales of items, wherein said postage metering services facilitate shipment of said items.

6. The system of claim 1, wherein said postage control code is operable to perform a postage value settlement operation for payment of said postage value after said requested postage value is dispensed.

7. The system of claim 6, wherein said postage value settlement operation is performed upon the occurrence of an event.

8. The system of claim 7, wherein said event comprises said accumulated postage value register reaching a predetermined threshold value.

9. The system of claim 1, further comprising:

a database storing a transaction history, wherein said transaction history is updated to include information with respect to dispensing said requested postage value.

10. The system of claim 9, wherein said postage control code accesses said transaction history when reconciling said accumulated postage value for post-payment processing of said accumulated postage value.

11. The system of claim 1, wherein said postage value settlement operation is performed periodically.

12. The system of claim 11, wherein a period for said postage value settlement operation is selected to provide payment for said postage value in a time frame consistent with a pre-payment model in which credit transactions are settled in batch periodically.

13. The system of claim 1, wherein said plurality of postage registers include an ascending register, and wherein said ascending register is also incremented by said requested postage value when said requested postage value is dispensed.

14. A method for metering postage value, said method comprising:

receiving a request for a desired amount of postage value;

advancing, by a computer based system, an accumulated postage value amount in a postage security device by at least a portion of said desired amount of postage value;

outputting a digital representation of said desired amount of postage value from said postage security device;

obtaining payment for said at least a portion of said desired amount of postage after said outputting said digital representation of said desired amount of postage; and decrementing, by said computer based system, said accumulated postage value by an amount of said payment, wherein said advanced accumulated postage value has been used for generating said digital representation.

15. The method of claim 14, wherein said request is issued by an end user to a postage metering services provider, said postage metering services provider being separate from an entity providing a postal server operable with said postal security device to output said digital representation of said desired amount of postage.

16. The method of claim 15, wherein said postage metering services provider provides services to said end user in addition to postage metering services, and wherein said postage metering services are ancillary to said services provided in addition to said postage metering services.

17. The method of claim 16, wherein said services provided in addition to said postage metering services comprise sale of items to be shipped using said postage metering services.

18. The method of claim 14, wherein said advancing an accumulated postage value amount comprises:

incrementing an accumulated postage register of said postage security device.

19. The method of claim 18, further comprising:

decrementing a descending register of said postage security device by at least a portion of said desired amount of postage value to a predetermined minimum value, wherein said at least a portion of the desired amount of postage that the accumulated postage value amount is advanced comprises a portion of said desired amount of postage remaining after said decrementing said descending register.

20. The method of claim 14, wherein said advancing an accumulated postage value amount comprises:

decrementing a descending register of said postage security device to a value below zero.

21. The method of claim 14, further comprising:

incrementing an ascending register amount in said postage security device by said desired amount of postage value.

22. The method of claim 14, wherein said obtaining payment comprises:

obtaining payment from a pre-paid account.

23. The method of claim 14, wherein said obtaining payment comprises:

obtaining payment from a credit account.

24. The method of claim 14, wherein said obtaining payment comprises:

issuing an invoice for an amount including an accumulated amount of postage value.

25. A method comprising:

receiving a request for a desired amount of postage value;

incrementing, by a computer based system, an accumulated postage register by said desired amount of postage value;

incrementing an ascending register by said desired amount of postage value;

issuing representation of said desired amount of postage value for use in a postage indicium;

receiving payment for said desired amount of postage value after said issuing said representation of said desired amount of postage value, and decrementing, by said computer based system, said accumulated postage register by a payment amount, said payment amount including at least said desired amount of postage value, wherein said ascending register is not decremented when said accumulated postage register is decremented by said payment amount.

26. The method of claim 25, further comprising:

initiating a postage value settlement operation to obtain payment for said desired amount of postage.

27. The method of claim 26, wherein said postage value settlement operation is initiated periodically.

28. The method of claim 26, wherein said postage value settlement operation is initiated upon the occurrence of an event.

29. The method of claim 26, wherein said postage value settlement operation decrements said accumulated postage register.

30. The method of claim 25, further comprising:

receiving payment for said desired amount of postage.

31. The method of claim 30, wherein said receiving payment comprises:

receiving payment from a credit account.

32. The method of claim 30, wherein said receiving payment comprises:

receiving payment from a debit account.

33. The method of claim 30, wherein said receiving payment comprises:

receiving payment from a pre-paid account.

34. The method of claim 30, wherein said receiving payment comprises:

receiving payment from a plurality of accounts.

35. The method of claim 25, wherein said accumulated postage register and said ascending register are stored within a postage security device when incremented.

36. The method of claim 25, further comprising:

establishing a maximum allowable amount of said accumulated postage register based at least in part on a category of user.

* * * * *

UNITED STATES PATENT AND TRADEMARK OFFICE

CERTIFICATE OF CORRECTION

PATENT NO. : 8,775,331 B1
APPLICATION NO. : 11/616569
DATED : July 8, 2014
INVENTOR(S) : Mark Tsuie et al.

It is certified that error appears in the above-identified patent and that said Letters Patent is hereby corrected as shown below:

In the Specification
At column 1, line number 7, delete "co".
At column 10, line number 9, delete "221e" and replace with --221*c*--.

Signed and Sealed this
Sixteenth Day of September, 2014

Michelle K. Lee
*Deputy Director of the United States Patent and Trademark Office*